US010618134B2

(12) United States Patent
Noeldner et al.

(10) Patent No.: US 10,618,134 B2
(45) Date of Patent: Apr. 14, 2020

(54) GALVO COOLING AIR BYPASS TO REDUCE CONTAMINATION (71) Applicant: Preco, Inc., Somerset, WI (US)

(72) Inventors: Kevin Noeldner, Somerset, WI (US); Ron Dillman, St. Croix Falls, WI (US); James J. Bucklew, Somerset, WI (US); Daniel B. Miller, Roberts, WI (US)

(73) Assignee: PRECO, INC., Somerset, WI (US)

( * ) Notice: Subject to any disclaimer, the term of this patent is extended or adjusted under 35 U.S.C. 154(b) by 549 days.

(21) Appl. No.: 15/352,117

(22) Filed: Nov. 15, 2016

(65) Prior Publication Data
US 2017/0136580 A1 May 18, 2017

Related U.S. Application Data (60) Provisional application No. 62/255,871, filed on Nov. 16, 2015.

(51) Int. Cl.
B23K 26/14 (2014.01)
B23K 26/00 (2014.01)
B23K 26/70 (2014.01)
B23K 26/16 (2006.01)
G02B 7/00 (2006.01)
G02B 27/00 (2006.01)
(Continued)

(52) U.S. Cl.
CPC .......... *B23K 26/703* (2015.10); *B23K 26/082* (2015.10); *B23K 26/0846* (2013.01); *B23K 26/16* (2013.01); *B23K 26/706* (2015.10); *G02B 7/008* (2013.01); *G02B 27/0006* (2013.01)

(58) Field of Classification Search
CPC ................. B23K 26/70; B23K 26/16
See application file for complete search history.

(56) References Cited

U.S. PATENT DOCUMENTS 5,303,081 A * 4/1994 Totsuka ............... G02B 7/1815
219/121.13
5,359,176 A * 10/1994 Balliet, Jr. .......... B23K 26/1476
219/121.67
(Continued)

FOREIGN PATENT DOCUMENTS

WO 2008115367 A2 9/2008

OTHER PUBLICATIONS

European Search Report issued for corresponding EP application No. 16198289.7, dated Mar. 7, 2017.

Primary Examiner — Dana Ross
Assistant Examiner — Lawrence H Samuels
(74) Attorney, Agent, or Firm — Westman, Champlin & Koehler, P.A.; Z. Peter Sawicki; Amanda M. Prose (57) ABSTRACT A system and method of cooling and purging a laser processing system comprising at least one galvo system for directing at least one laser beam to a work piece and a protection window mounting plate comprising at least one protection window secured in a corresponding cavity of the mounting plate where the plate is configured with at least one air flow passageway in the mounting plate for each protection window such that an airflow used to cool each galvo systems is directed through the mounting plate vis the passageway and further directed past the window cavity to purge the cavity, where the purging air flow is then vented or exhausted from the laser system.

7 Claims, 5 Drawing Sheets (51) Int. Cl.
  *B23K 26/082*  (2014.01)
  *B23K 26/08*  (2014.01)

(56) References Cited

U.S. PATENT DOCUMENTS

| | | | | |
|---|---|---|---|---|
| 5,650,078 | A * | 7/1997 | Hamura | B23K 26/032 219/124.34 |
| 7,044,610 | B2 * | 5/2006 | Beyer | B08B 15/04 347/22 |
| 7,557,326 | B2 * | 7/2009 | Boillot | B23K 26/032 219/121.63 |
| 7,605,345 | B2 * | 10/2009 | Fukuda | B23K 26/147 219/121.84 |
| 8,084,712 | B2 * | 12/2011 | Griffiths | B41J 3/4073 219/121.68 |
| 8,344,285 | B2 * | 1/2013 | Sykes | B23K 26/12 219/121.68 |
| 2003/0197909 | A1 * | 10/2003 | Beyer | B08B 15/04 359/509 |
| 2005/0206894 | A1 * | 9/2005 | Fukuda | B23K 26/147 356/318 |
| 2005/0247681 | A1 * | 11/2005 | Boillot | B23K 26/032 219/121.63 |
| 2005/0248681 | A1 | 11/2005 | Boillot et al. | |
| 2015/0144608 | A1 * | 5/2015 | Miller | G02B 26/105 219/121.76 |
| 2015/0205098 | A1 * | 7/2015 | Shih | B29D 11/0074 65/43 |

\* cited by examiner

GALVO COOLING AIR BYPASS TO REDUCE CONTAMINATION

CROSS-REFERENCE TO RELATED APPLICATION

The present application is based on and claims the benefit of U.S. provisional patent application Ser. No. 62/255,871, filed Nov. 16, 2015, the content of which is hereby incorporated by reference in its entirety.

FIELD OF THE INVENTION

The present disclosure relates to a high-speed laser beam cutting and/or laser processing system, and more particularly to a system employing a novel configuration of a protection window mounting comprising an air exhaust pathway configured to reduce contamination in the laser system proximate the laser beam steering mirrors and protection window.

BACKGROUND

Laser processing of a moving web with one or more laser beams can be done to increase speed and efficiency of a laser system. Existing laser perforation systems commonly employ some sort of scanning system or galvanometer (or "galvo" for short) system for directing a laser beam. The galvanometer may utilize rotatable mirrors to move a laser beam or beams across the web in a predetermined pattern. Alternatively, in a perforating system it is also common to use a fixed beam that is pulsed on and off to create perforations in the web direction. The system that this technology has been implemented on is designed to be flexible and form perforations, slits, profiled cutouts, laser scoring, and singulated parts.

The laser beams generate heat and at least some of this heat generated is absorbed by the galvo system or galvo systems for direction and steering the beams along the substrate and/or web. The galvo systems are further susceptible to damage from heat as each mirror in the galvo system is independently steered by a respective motor, which also generates heat during operation. A mechanism may be incorporated into laser systems to reduce the heat effects on the galvo systems as the mirrors can be damaged, especially with higher powered lasers. Accuracy of the laser steering may also be negatively impacted. If a mirror starts to overheat, it can damage the reflective coating thus absorbing more laser light and heat and making it inoperable. Thus, a method of creating air flow such as using compressed air or cooling fans may be installed to cool down the galvo systems.

When laser processing a substrate, debris may also accumulate in the system and if not controlled, may negatively impact the galvo systems. Protection windows are incorporated to prevent debris from entering the galvo systems, however these windows generally require cleaning of accumulated debris to ensure laser beam accuracy.

SUMMARY

An aspect of the present disclosure relates to a laser processing system configured to utilize clean, dry, filtered compressed air to cool a galvo system in laser processing system. A galvo system is used to direct a laser beam to a substrate or web for laser processing. Protection windows are used to prevent contamination of the galvo systems in the laser processing system and these windows are generally positioned below the galvo system and between the galvo and the substrate or workpiece. A protection window mounting plate is configured to house at least one protection window and is configured to be mounted near the galvos to protect the galvos from debris and/or smoke generated during laser processing. The mounting plate is further configured such that for each window in the mounting plate, the mounting plate is configured with an air flow passageway to direct the cooling airflow away from the galvo and to the corresponding protection window for purging the cavity in which the protection window is positioned as well as for cleaning the protection window. The air is then exhausted from the laser processing system.

In systems where a high density galvo block is incorporated, the galvo block comprises one or more galvo systems. The protection window mounting plate may be an integral portion of a housing for the high density galvo block, or may be a separate piece configured for positioning near (e.g., below) the galvos in the laser system. Further, where a high density galvo block is incorporated, the protection window for each galvo system is positioned in closer proximity to the respective galvo mirrors. The protection window or windows are positioned in a cavity just below the galvo mirrors where the window can become easily contaminated and difficult to clean. The system of the present disclosure incorporates air flow to purge the cavity in which the windows are positioned. An exhaust air flow generally used for cooling the galvo systems is redirected to purge the cavity in which the window is mounted. This method could be used for either high density or a single galvo system.

At least one opening, or slit forming an airflow passage way is machined or otherwise provided to the protection window mounting plate and the at least one passage way is positioned on at least one side of the protection window to be cleaned by the mirror cooling air, which is directed to and through the cavity in which the window is positioned. The mounting plate extends across the laser system substantially coextending with the web width. Thus, the mounting plate is generally positioned to extend across the web and thus across the workpiece in a direction transverse to the web direction of travel. Galvo protection windows are positioned along the mounting piece and are adjacent to each galvo in the system. The passageways in the mounting form an air flow path from the pathway for cooling the galvo mirrors to directing the airflow under and across a bottom face of the protection window to purge the window.

Another aspect of the present disclosure relates to utilizing cooling exhaust air flow to clean one or more protection windows positioned in a cavity proximate one or more mirrors for steering one or more laser beams to a substrate for processing. A protection window is positioned in a cavity below the galvo, such that when a plurality of galvos are incorporated into the laser system there is at least one protection window for each galvo. The protection window or windows each allow the laser to be transmitted through the window without interruption and directed from the galvo to the workpiece. When laser processing a substrate, one or more galvo systems are used for steering one or more laser beams to the substrate for selected processing. A flow of cool air is directed along the galvo mirrors to cool the mirrors during laser processing. The method further includes redirecting this air flow through an added passageway having at least one opening along at least one end or side of the protection window. The passageway directs the cooling air from the galvo to the protection window to purge the protection window and window cavity. The air is then exhausted from the laser system.

DETAILED DESCRIPTION

The present disclosure relates to a laser processing system that utilizes one or more laser beams that are capable of simultaneously processing a work piece. The work piece includes a substrate which may be a sheet, film or other substrate suitable for laser processing and may be stationary or on a continuous moving web for processing. The terms "web" and "work piece" will be used interchangeably hereinafter and should be understood to include both stationary and continuously moving substrates for laser processing.

The system and method utilize a cooling air flow for the galvo system to also clean one or more protection windows and a protection window cavity during laser processing. Laser processing systems comprise a laser source and at least one galvo system for directing and steering one or more laser beams generated by the laser source to a substrate for laser processing. The galvo systems are generally positioned above or over a substrate, which may be continuously moving (e.g. a continuous roll) or may comprise sheets of substrate processing. A web moves in a web direction though the laser processing system to move the substrate through the path of the laser beam or laser beams to process (e.g. cut, score, melt etc.) the substrate in selected shapes or patterns. The laser system of the present disclosure may be a laser system configured for treating multi-layer films or substrates of various compositions and may also be configured for treating metals or other materials.

As illustrated in FIGS. 1-5, one or more laser beams 12 are directed to work piece 14, and are steered on and around the work piece by a corresponding one or more galvo systems 16. For ease of discussion and illustration, the actual galvo has been removed from the figures, but a box representing the galvo 16 is used. In the embodiments described below, a laser source (not shown) is provided to produce at least one and preferably a plurality of laser beams 12 where each laser beam may be steered by a corresponding galvo system 16. Thus, a plurality of galvo systems 16 may be mounted proximate and adjacent one another in the laser processing system 10 so as to simultaneously or subsequently receive and direct a plurality of laser beams to the work piece. Alternatively, the plurality of galvo systems may be mounted in a high density galvo block.

As referred to throughout this description, the terms "galvo" and "galvo system" may be used interchangeably and refer to a configuration having a single galvo motor and mirror, with single axis motion (x or y) and alternatively also refer to a set, or pair, of galvo motors and mirrors, the set or pair including two axis motion (x and y). The galvos or galvo systems of the present disclosure may have a pair of mirrors, where each mirror is selectively directed in order to selectively steer a laser beam to a selected area on a substrate or work piece and/or within a field of view of the steered laser beam. Each mirror is selectively directed via a dedicated motor, referred to as a galvo motor, which drives the movement of that mirror. Of the pair of mirrors in a galvo system, a first mirror is generally an "x" mirror and a second mirror is generally a "y" mirror. The first mirror by its respective motor is generally positionable to steer the laser beam in an "x" direction with respect to the second mirror which by its respective motor is generally positionable to steer the laser beam in a "y" direction. The directions are not limited in orientation but instead refer to a relationship of their direction with respect to one another in a Cartesian coordinate system. The laser beam is thusly capable of being steered or directed in the x and y directions with respect to the work piece. As previously noted; while this disclosure mainly describes a pair of galvo mirrors, this disclosure also recognizes and is not limited to the pair of mirrors, as a plurality of single selectively rotatable mirrors for laser beam steering in a single direction is within the scope of this disclosure. For a single axis galvo system the adjacent field of views will not necessarily overlap. A galvo system can therefore be comprised of a single axis or multiple (pair) axis galvo driven mirrors.

The use of a multi-laser beam system increases the number of cutting beams operable on a given area of a work piece 14. Further, increasing the number of cutting laser beams in a given area decreases the time needed to complete a cutting operation and simultaneously improves the accuracy of the placement of the laser beams relative to each other on the work piece. Along with increasing the number of cutting beams and the number of galvos in a system, the heat produced by the laser beams and the galvo motors within the system can negatively impact the galvo mirrors and thus the laser beam focal point and positioning accuracy on the work piece. Thus, a cooling air flow is introduced to cool the galvos 16 during laser processing. Embodiments described herein utilize this cooling airflow to purge the protection window or windows 22 and the protection window cavity 20 to clean the system.

Figure 1:
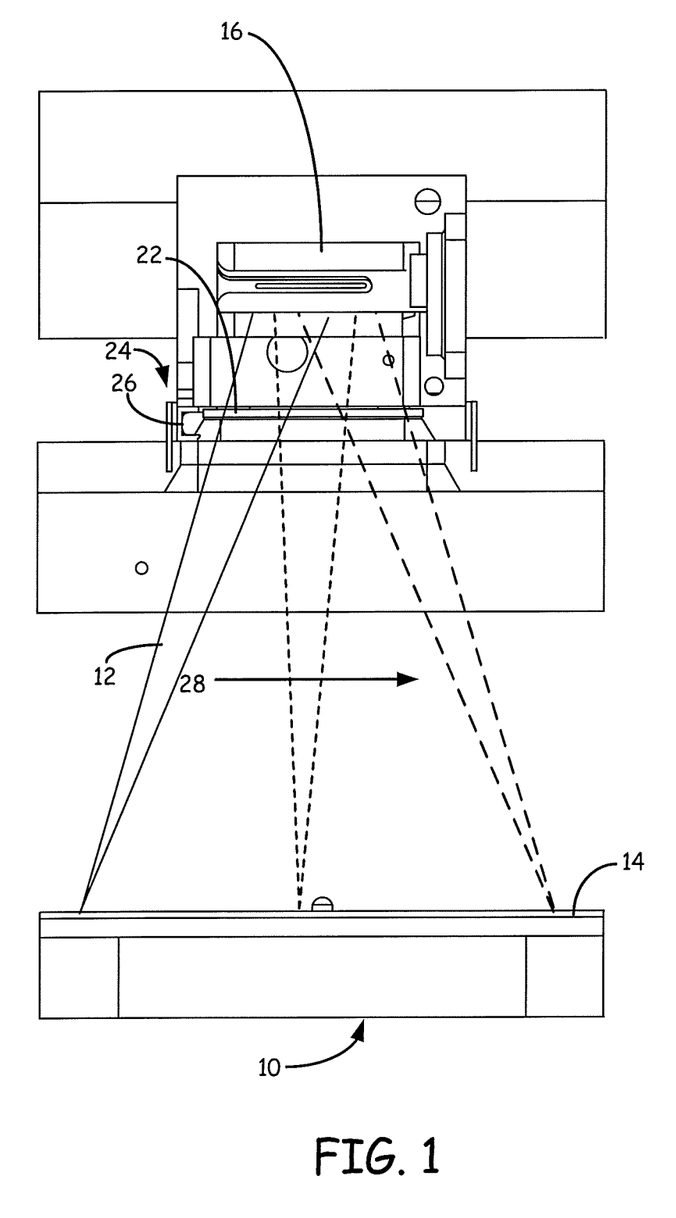
FIG. 1 is a front view of a galvo cooling air bypass in a laser system.
Figure 2:
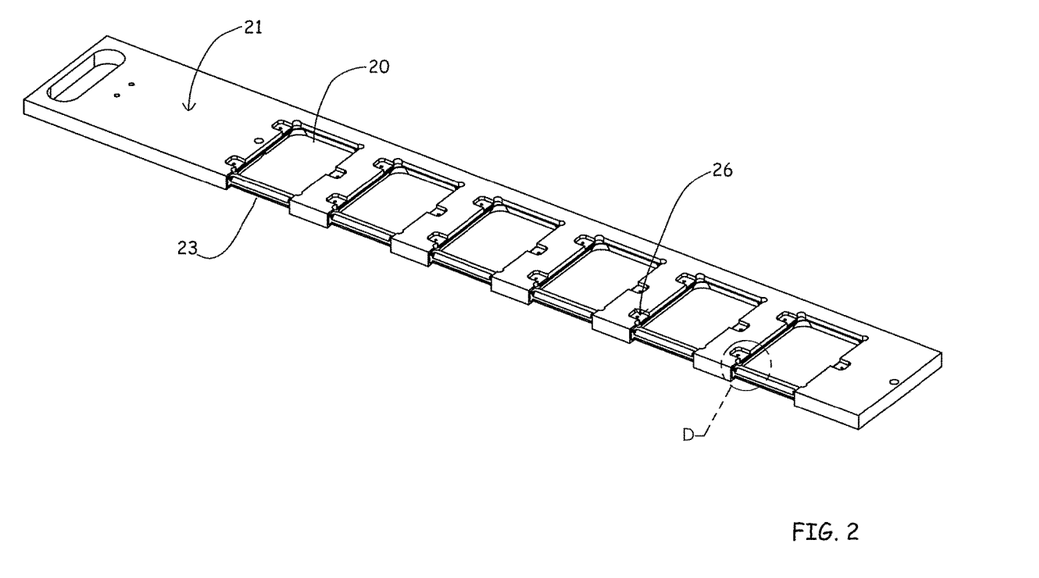
FIG. 2 is a perspective view of a protection window mounting plate for use with a multi-laser beam laser processing system.
Figure 3:
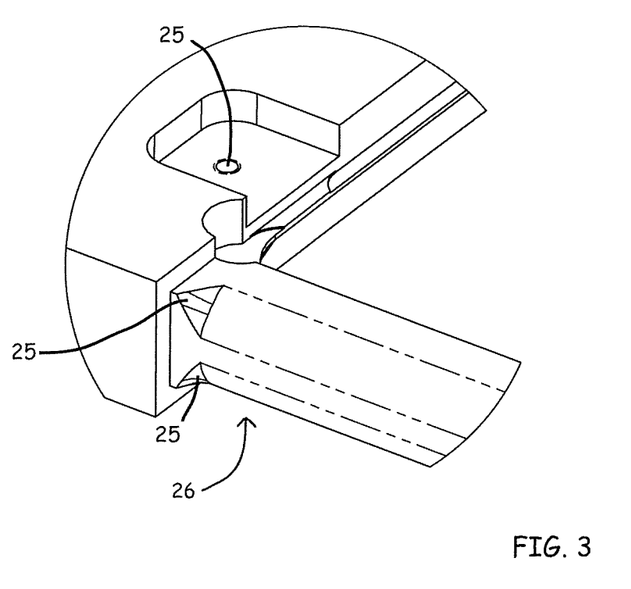
FIG. 3 is an expanded view of an air bypass passageway for the protection window mounting plate illustrated at D in FIG. 2.
Figure 4:
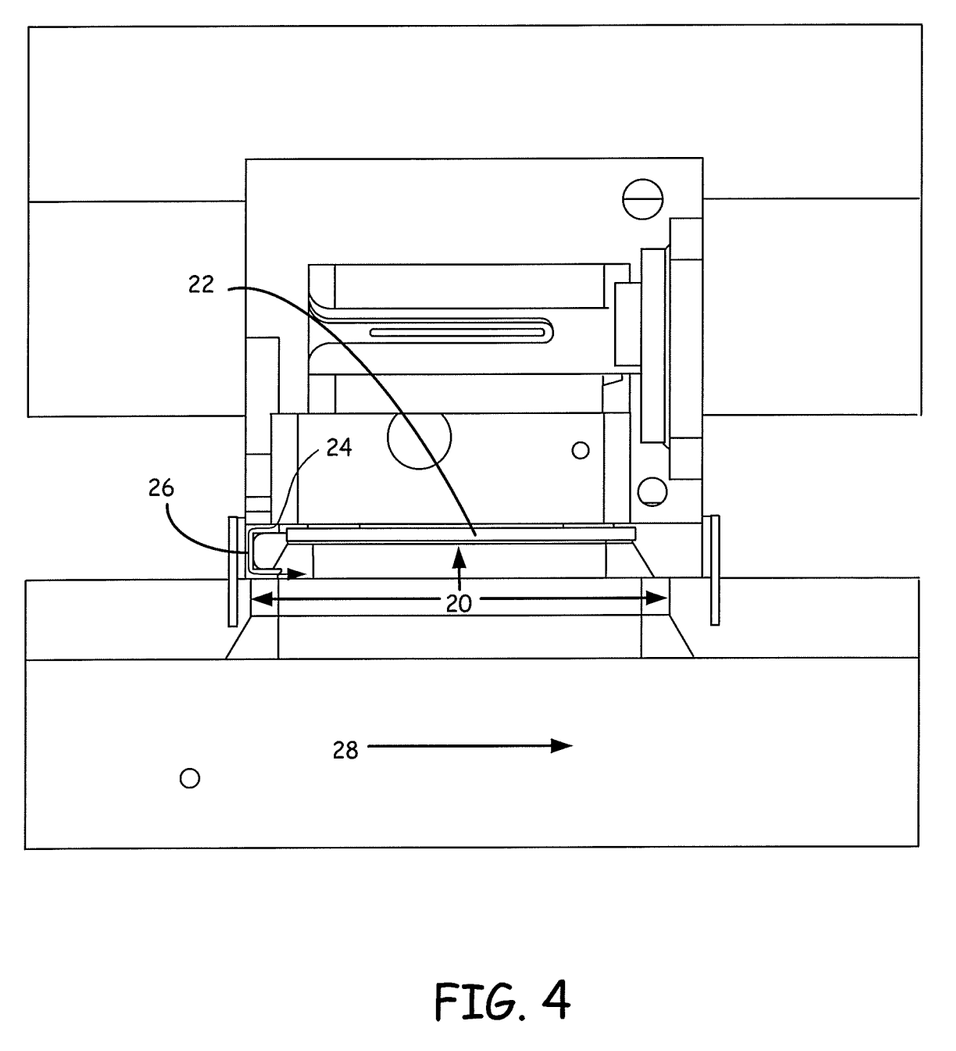
FIG. 4 is an expanded side view of the passageway.

As illustrated in FIGS. 2-3, a protection window mounting plate 21 comprises the protection window 20 and the corresponding cavities 23 for each window 20. The mounting plate 21 may be a machined plate having a length and a width sufficient to hold openings for transparent windows 20 for each galvo system present in the laser system 10. The plate is substantially of a shape corresponding to the opening in the laser system below the galvo systems 16 such that the plate 21 and the windows 20 protect the galvo systems 16 from debris and other contaminants generated by the laser processing of the work piece. The plate 21 may be constructed of aluminum, steel or another similar metal and may be integrally formed and/or machined with openings 23 corresponding substantially to the field of view of each galvo system 16. The field of view of the laser beam 12 may be greater than the dimensions of the window 20. The laser beam can be directed along a path producing a pyramid shaped pattern greater than the dimensions of the window. In laser processing the dimensions (size) of the window affects the selection of a specific slice of the path or portion of pyramidal path along which the laser is directed. The openings may be rectangular in shape or may comprise another shape suitable for supporting the field of view of each corresponding galvo. Further, in embodiments where the openings are fitted with a material to protect the galvos, the window material may comprise any transparent material or material where the wavelength range of the laser beams is transmissive to the window material. Examples of materials the windows 20 may be comprised of include, but are not limited to, glass or zinc selenide.

The plate 21 is thus configured with openings providing cavities 23 for insertion of the protection window material such that the protection windows 20 are secured in the openings 23. The windows may be substantially secured on all sides. The plurality of openings for the protection windows are machined into the plate 21 and the number of openings corresponding to the number of galvos present in the system 10 to the extent that there is a protection window for each galvo system and thus corresponding laser beam, whether the entirety or a portion of the laser beams and galvos are utilized in any given pass of the laser processing system.

As illustrated in FIG. 3, the openings 23 are further machined with a passageway 26 to allow the cooling airflow or compressed air flow to be directed from the galvos to the opposite side of the protection windows 20 and to the cavity 22 for purging the system. A side of the cavity 23 is rounded and openings 25 are provided for directing airflow from the galvos 16 to the cavity 23 for cleaning and purging the protection windows 20. The passageway 26 is machined into at least one side of the cavity opening for holding the protection window in the mounting plate 21. Thus, there may be one or more passageways 26 for each window. These passageways 26 direct the air flow used to cool each galvo 16 to clean and purge the area below the corresponding protection window 20. More specifically, the cooling is directed to the face of the protection window 20 and protection window cavity adjacent the workpiece and the air flow is directed to clean the windows 20 and cavity 22 before being exhausted from the system 10 in the direction represented by arrow 28.

According to the present disclosure, the method of directing the cooling air to purge and clean the protection windows is advantageous and sufficient to cool one or a plurality of galvo systems while also reducing contamination in the system. For example, the pathway 24 and passageway 26 may effectively cool the galvos and purge the window cavity in systems having laser beams over 400 watts as well as high power laser beams, such as produced by an approximately 1,000 watt laser. While the embodiments illustrated in FIGS. 1-4 illustrate a single passageway 26 in the mounting plate 21 on one side of each protection window 20, it should be understood that one or more passageways 26 may be incorporated for each window 20. In some laser processing systems, the mounting plate 21 may be formed with more than one passageway 26 on one or more sides of the protection mirror to manipulate the air flow path for purging according to various laser processing system settings, window size, air flow rate etc.

The plate 21 is generally positioned below the galvos such that each protection window is aligned with a galvo in order to allow the galvo to direct the laser beam to the work piece. In one embodiment of the present disclosure, the laser system 10 comprises a high density galvo block 18. When a plurality of galvo systems 16 are nested in a galvo block 18, the galvos are advantageously positioned in closer proximity to one another and the protection windows 20 can be positioned closer to the mirrors by being positioned in a cavity formed just below the mirrors.

Figure 5:
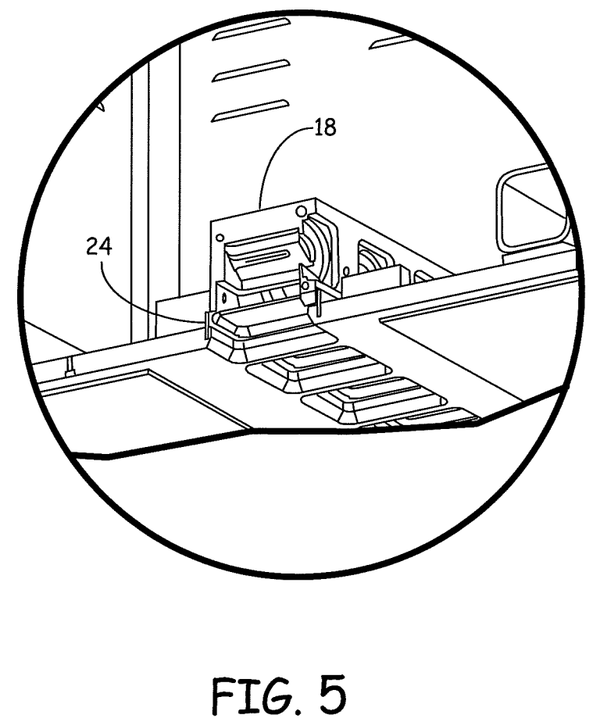
FIG. 5 is an expanded side view the galvo protection window and air flow pathway in a laser processing system.

Referring to FIG. 5, in the embodiment wherein the galvos 16 are nested within the high density galvo block 18 to steer and otherwise direct multiple laser beams 12 simultaneously and in a coordinated manner within a selected field of view on the web or work piece, the galvos 16 are nested in a formed or machined housing configured to accept the plurality of galvo systems 16. The nested galvo block 18 illustrated generally in FIG. 5 may house anywhere from two galvo systems 16 up to six or more galvo systems 16, which allows the high density galvo block 18 to steer anywhere from two to six or more individual laser beams 12. The present disclosure is not limited to a specific number of galvo systems, the six (6) galvos illustrated are illustrated for the purpose of an example and should not be construed as a limitation on this disclosure. Further, the present disclosure is applicable to a system having a single galvo or a plurality of individual galvo systems positioned in the laser system. The galvo block 18 further comprises integral passages and openings for directing the cooling air flow to each galvo for cooling the galvo systems during laser processing. Additional cooling processing, including fluid cooling and vents may be incorporated into the galvo block. The protection window mounting plate 21 may be a separate piece insertable and positionable in the laser system 10 in close proximity to the galvo block 18 and galvos 16. The mounting plate may also be integral to a face of the galvo block 18.

The galvo systems 16 of the present disclosure may be built from individual components (i.e. mirror and motor). Also galvo systems in commercially available housings could be used by stripping them from their housings and incorporating them into a single high density housing configured with air and fluid cooling systems, the housing being configured to receive and nest each galvo adjacently and in closer proximity to one another as compared to galvo systems in commercial housings which are simply positioned adjacent to one another in a laser system. As such, the system and method of cooling and purging a galvo system and corresponding protection window incorporated into laser system 10 of the present disclosure may be used in laser systems where commercially packaged galvo systems are incorporated into the laser system and wherein a galvo block having a plurality of nested galvos therein is incorporated.

In the embodiment where one or more galvo system 16 are used and where the one or more galvos are utilized in individual housings or casings, one or more protection window 20 may be incorporated. In this embodiment, the mounting plate 21 is still positioned below the galvo(s) 16 and/or between the galvo(s) 16 and the workpiece 14. The mounting plate 21 is configured with one or more openings and protection windows 20 and the airflow pathway 24 and passageway 26 for each window 26 is used to receive a galvo cooling air flow and direct the air flow to the protection window for purging the system. The air flow is then exhausted through the system 10.

The galvo systems 16 are positioned in a laser processing system 10 such that the galvos are positioned generally adjacent a laser source and above the moving web and thus above the work piece or substrate to be processed. In the embodiment where a high density galvo block 18 is used, the protection windows are positioned in closer proximity to the plurality of galvo systems 16 and the windows are positioned within or at least partially within a cavity below the galvos. The windows can quickly become contaminated and are positioned in a cavity such that the windows are difficult to clean. The galvo block 18 utilizes a cooling air flow through the galvo block 18 as a method of reducing the heat generated and absorbed by the galvo block components and housing including the galvos. The exhaust cooling air that is generally vented as exhaust from the laser processing system 10 is advantageously directed to a cavity below or on an opposing side of the protection window from the galvo system. The cooling airflow then becomes or is also a purging air flow. The purging air flow pathway 24 is configured to direct the clean, dry, filtered air downwardly into the cavity and across the cavity to clean the cavity and the window.

Although the present disclosure has been described with reference to preferred embodiments, workers skilled in the art will recognize that changes may be made in form and detail without departing from the spirit and scope of the disclosure.

The invention claimed is:

1. A laser processing system comprising:
   a laser source;
   at least one galvo system for directing at least one laser beam to a work piece;
   at least one window secured in a mounting plate wherein the at least one window is positioned near the galvo system such that the galvo system directs the laser beam through the at least one window to the work piece; at least one air flow configured to cool the at least one galvo system;
   at least one air flow passageway in the mounting plate, the at least one air flow passageway positioned proximate the at least one window and configured to receive the cooling air flow and direct the cooling air flow through a thickness of the mounting plate to purge the at least one window of debris.

2. The system of claim 1, wherein the at least one galvo system is housed with at least a second galvo system in a high density galvo block.

3. The system of claim 2, wherein the mounting plate comprises at least one protection window corresponding to each at least one and at least second galvo systems in the high density galvo block.

4. The system of claim 3, wherein the mounting plate comprises at least one air flow passageway for each at least one protection window.

5. A method of cooling and purging a laser system comprising:
   providing a laser source for producing at least one laser beam;
   providing at least one galvo system for directing the at least one laser beam to a work piece;
   providing a protection window mounting plate comprising at least one protection window secured in a corresponding cavity of the protection window mounting plate;
   providing at least one air flow passageway in the protection window mounting plate for each at least one protection window;
   directing at least one cooling air flow for cooling the at least one galvo system during laser processing the work piececa;
   further directing the cooling air flow from the galvo system to and through the at least one air flow passageway in the protection window mounting plate to purge a corresponding cavity of debris; and
   exhausting the cooling and purging air flow from the laser system.

6. The method of claim 5, wherein the at least one galvo system comprises a plurality of galvo systems housed in a high density galvo block.

7. The method of claim 6, wherein the protection window mounting plate is a side of the high density galvo block such that each at least one protection window is in close proximity to a corresponding galvo system of the plurality of galvo systems.

* * * * *